United States Patent [19]

Byerley

[11] Patent Number: 5,441,587
[45] Date of Patent: Aug. 15, 1995

[54] TRANSFER RING HAVING SELECTIVE ADJUSTABILITY OF SHOE MOVEMENT

[75] Inventor: Mark S. Byerley, Greenback, Tenn.

[73] Assignee: WYKO, Inc., Greenback, Tenn.

[21] Appl. No.: 289,766

[22] Filed: Aug. 12, 1994

[51] Int. Cl.⁶ .............................................. B29D 30/30
[52] U.S. Cl. .................................. 156/406.2; 156/126
[58] Field of Search ............... 156/406.2, 126, 396, 156/128.1, 111, 127

[56] References Cited

U.S. PATENT DOCUMENTS

| | | | |
|---|---|---|---|
| 3,865,669 | 2/1975 | Todd | 156/406.2 |
| 3,865,670 | 2/1975 | Habert | 156/406.2 |
| 4,105,486 | 8/1978 | Cantarutti | 156/126 |
| 4,437,920 | 3/1984 | Kubo | 156/126 |

*Primary Examiner*—Geoffrey L. Knable
*Attorney, Agent, or Firm*—Paul E. Hodges

[57] ABSTRACT

An improved transfer ring for use in vehicle tire making equipment wherein the carcass of the tire and the belt and tread package are made up at different and separate physical locations and thereafter the belt and tread package is transferred onto the carcass employing the transfer ring whereupon the two components of the tire are married. The present transfer ring includes first and second motive means for effecting grasping motion of a plurality of shoes of the transfer ring to cause the shoes to engage the belt and tread package about its outer circumference. In a preferred embodiment, the grasping motion is effected in multiple stages and the extent of motion is selectively adjustable. A method for effecting transfer of a belt and tread package is disclosed.

15 Claims, 7 Drawing Sheets

TRANSFER RING HAVING SELECTIVE ADJUSTABILITY OF SHOE MOVEMENT

FIELD OF INVENTION

This invention relates to equipment useful in the manufacture of vehicle tires, and particularly to a transfer ring useful in the transfer of a belt and tread package onto a tire carcass wherein the transfer ring has improved adjustability for grasping the package for effecting the transfer.

BACKGROUND OF THE INVENTION

In the manufacture of vehicle tires, it is a common practice to make up a carcass for the tire, this carcass including substantially all of the tire except the outer circumferential reinforcing belts and tread package, at a first location and then transfer the carcass to a tire forming drum where the carcass is positioned for receiving a ring-shaped belt and tread package about the outer circumference of the carcass. The belt and tread package is made up separate from the carcass and therefore must be transferred from its manufacturing location to the location of the carcass and positioned thereupon precisely about the circumference of the carcass. The geometry of the belt and tread package and the fact that it must be placed about the outer circumference of the carcass only permits the package to be grasped about its outer circumference for effecting the transfer.

The operation of transferring of the belt and tread package onto the carcass is of great importance in the successful manufacture of a vehicle tire. First, it will be recognized that vehicle tires must be balanced for rotational stability when installed on a vehicle. This requires, among other things, that all of the components of the tire be uniformly positioned about the circumference of the tire. It further requires that the components be positioned precisely symmetrically about a plane which extends through the center of the tire between the opposite sidewalls thereof.

As noted, a common practice in the manufacture of vehicle tires is to make up the tire carcass at one location, make up the belt and tread package at a different and physically separated location, and then to marry these components at a third location. This general procedure allows one to precisely form the carcass to the desired tire size to provide the base upon which the tire is finally formed. However, this procedure places inordinate requirements upon the equipment which is required to transfer the belt and tread package onto the outer circumference of the carcass for the reasons that, first, the belt and tread package is a relatively flimsy ring and because of its make up it is also subject to deleterious deformation when grasped by a transfer ring. Second, the belt and tread package must be quickly and precisely positioned about the outer circumference of the carcass so that the package is symmetrically positioned about the carcass before the two components can be joined to form the tire precursor which later is placed in a mold for final formation of the tire and its tread. Commonly, in the industry the time allowed for the transfer of the belt and tread package onto the carcass is very short, for example a few seconds.

Transfer rings of the prior art include one or more outer rings which serve to mount and house a plurality of shoes, each of which is a arcuate segment of a circle, that are movable radially inwardly and outwardly of their housing. This radial movement of the shoes permits the shoes to be retracted radially outward for positioning of the transfer ring about a belt and tread package residing on its formation drum (belt and tread drum) and to be advanced radially inwardly for contacting and grasping the belt and tread package while it is still on its formation drum. Thereupon the formation drum is collapsed to leave the belt and tread package in the grasp of the transfer ring. In the formation of a belt and tread package on its formation drum, it is required that one or more of the several layer components of package be in tension in order to insure their proper placement in the package. This tension is released when the formation drum is collapsed so that the package in the transfer ring tends to contract a slight amount and to at least partially fall away from the grasp of the transfer ring. This movement of the package is more pronounced at the top of the package since the package is oriented vertically within the transfer ring, and presents a problem when attempting to position the package about the circumference of the carcass. Prior art transfer rings have no provision for accommodating this movement of the belt and tread package upon the collapsing of the formation drum.

Further, it is desired that the compressive force applied by the shoes of the transfer ring to the belt and tread package be sufficient to "round up" the belt and tread package within the transfer ring, but the force cannot be such as will deleteriously deform the package. In the prior art transfer rings, there is provided a single closing movement of the shoes of the transfer ring about the belt and tread package. The radially inward limit of movement of the shoes is set for a given size belt and tread package. Thus, the prior art does not provide means for accommodating any circumferential movement of the belt and tread package after it has been initially grasped by the transfer ring. Importantly, it is to be understood that nonuniform circumferential movement of the belt and tread package by as much as a few thousandths of an inch are most important in that these small movements prevent the belt and tread package from being positioned with its center axis coincident with the center axis of the carcass, thereby resulting in an unbalanced tire.

It is an object of the present invention to provide an improved transfer ring.

It is another object of the present invention to provide an improved transfer ring in which there is provision for adjusting the circumferential uniformity of the belt and tread package after it has been grasped by the transfer ring.

It is another object of the present invention to provide a method for the transfer of a belt and tread package onto a carcass in the course of the manufacture of a vehicle tire.

These and other objects of the present invention will be recognized from the description contained herein, including the claims and the drawings in which:

SUMMARY OF THE INVENTION

In accordance with the present invention there is provided an improved transfer ring for use in vehicle tire making equipment wherein the carcass of the tire and the belt and tread package are made up at different and separate physical locations and thereafter the belt and tread package is transferred onto the carcass employing a transfer ring whereupon the two components of the tire are married. The transfer ring of the present invention includes first motive means for moving the shoes of the transfer ring radially between a first position of engagement with the belt and tread package and a second position of nonengagement with the belt and tread package, and a second motive means for moving the shoes of the transfer ring at least further radially inwardly of the ring after the first motive means has achieved its most radially inwardly limit of movement of the shoes of the transfer ring. By this means, the improved transfer ring of the present invention accommodates any tendency of the belt and tread package to alter its desired circular geometry following its release from its forming drum. In the preferred embodiment of the present invention, the first and second motive means comprise first and second piston-cylinder means that are operatively disposed in tandem and the operation of the second piston-cylinder means is activated upon the limiting out of the radially inwardly directed force effected by the first piston-cylinder means to move the shoes into engagement with the belt and tread package.

In accordance with one aspect of the invention, the second motive means is provided with means for selectively adjusting the extent of the radially inward movement of the shoes of the transfer ring by the second motive means. Further, there is provided means for visually indicating the extent of radially inward movement of each shoe of the transfer ring by reason of the force developed by the second motive means. Still further, in one embodiment, the shoes of the transfer ring are linked to the first and second motive means for movement of the shoes radially of the transfer ring by linkage which provides a one-to-one ratio of movement of each of the motive means and the radial movement of each shoe.

DETAILED DESCRIPTION OF INVENTION

Figure 1:
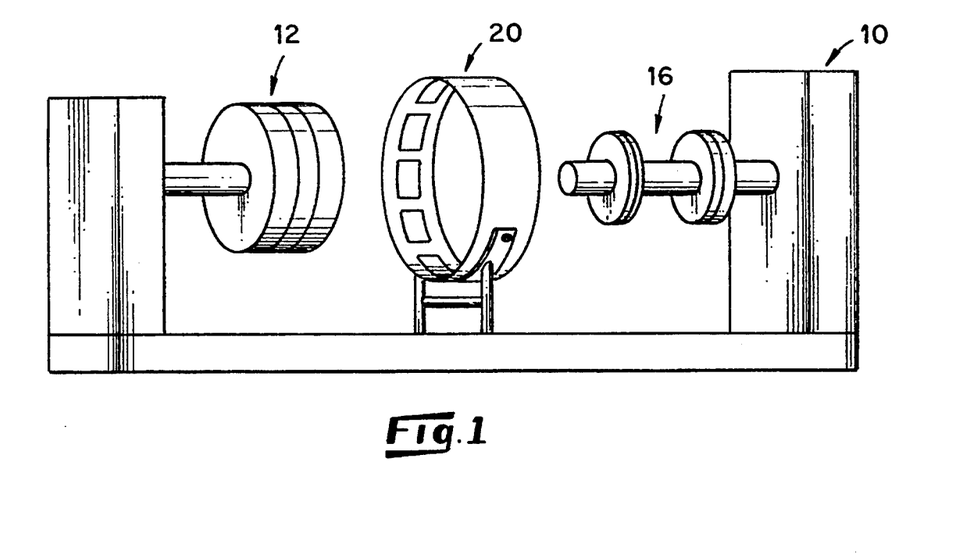
FIG. 1 is a schematic representation of a tire manufacturing machine which employs a transfer ring.
Figure 2:
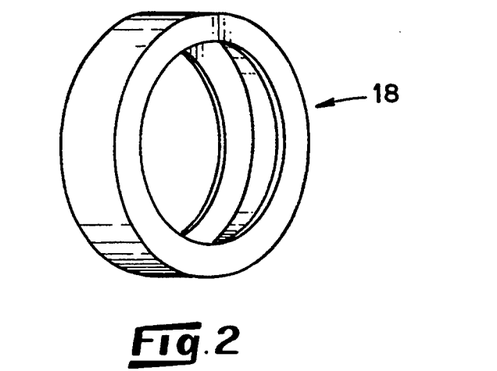
FIG. 2 is a representation of a vehicle tire carcass as formed on a bead lock drum.
Figure 3:
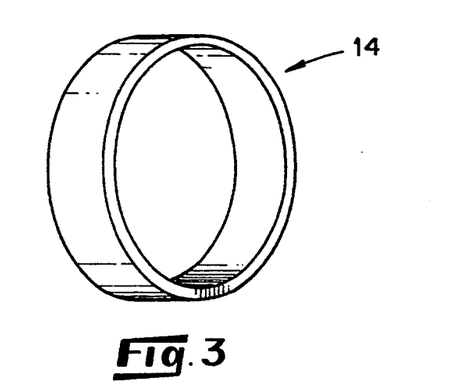
FIG. 3 is a representation of a belt and tread package as formed on a belt and tread drum.

Referring to the Figures wherein like parts are provided with like numerals, in one embodiment of the present invention, there is depicted in FIG. 1 a schematic representation of a typical tire-making machine 10 including a belt and tread drum 12 on which a belt and tread package 14 (see FIG. 3) is formed, a first stage drum 16 which receives thereon a carcass 18 (see FIG. 2), and a transfer ring 20 suitable for transferring the belt and tread package 14 from the belt and tread drum 12 onto the carcass 18.

A transfer ring 20 incorporating various of the features of the present invention is depicted in FIGS. 4-9. The depicted transfer ring 20 includes first and second outer housing rings 22 and 24 which are held in spaced apart and concentric relationship by a plurality of rod-type spacers 26. A mounting ring 28 is disposed between the housing rings 22 and 24 and is rotatably mounted with respect thereto as by means of a plurality of roller bearings 30 which are mounted on individual ones of the spacers 26. As required, the housing rings 22 and 23 are provided with mounting means 27 for mounting of the transfer ring on a vehicle tire manufacturing machine.

Figure 4:
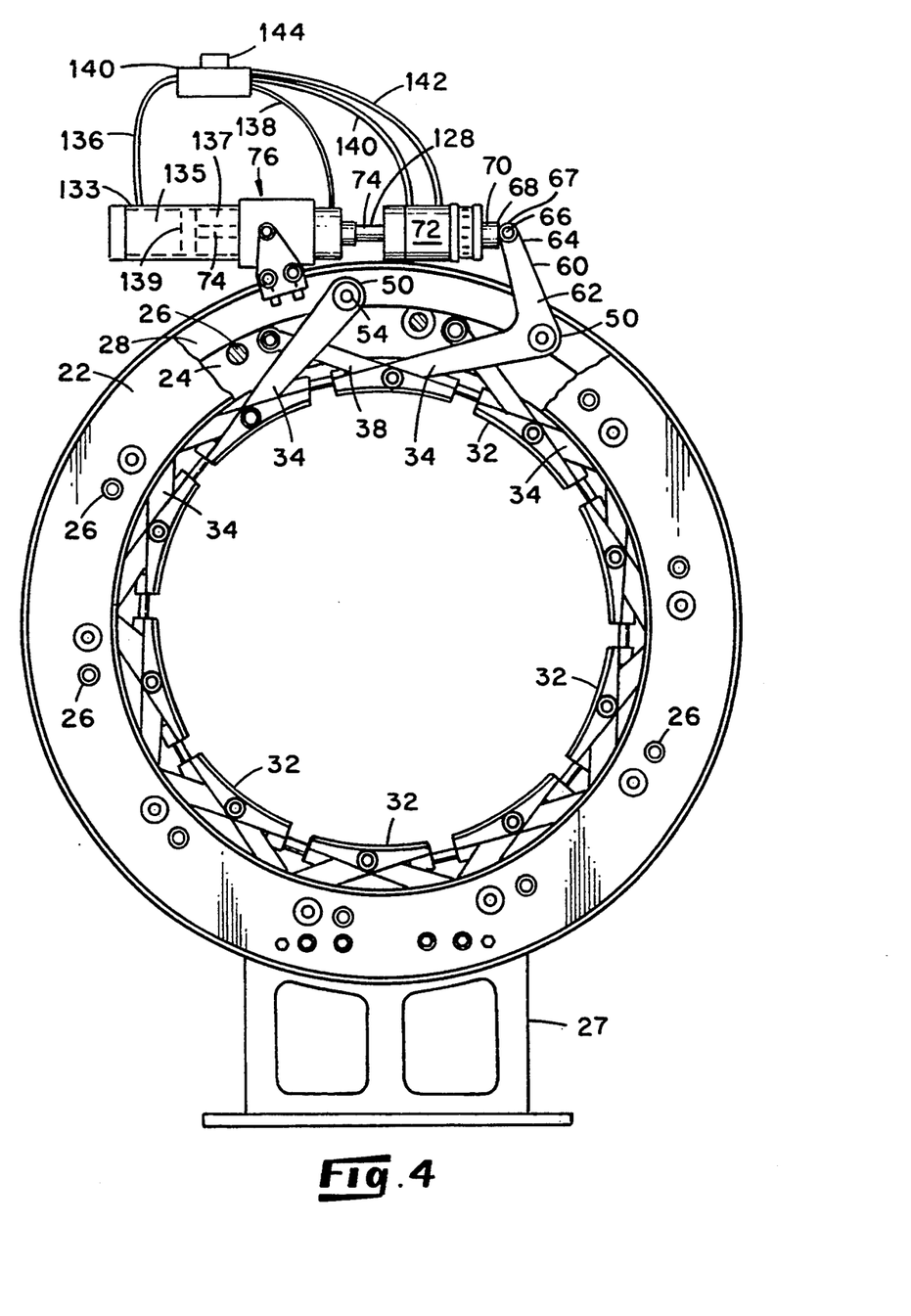
FIG. 4 is a side elevational view of one embodiment of a transfer ring embodying various of the features of the present invention and depicting the shoes in their radially midpoint position.
Figure 5:
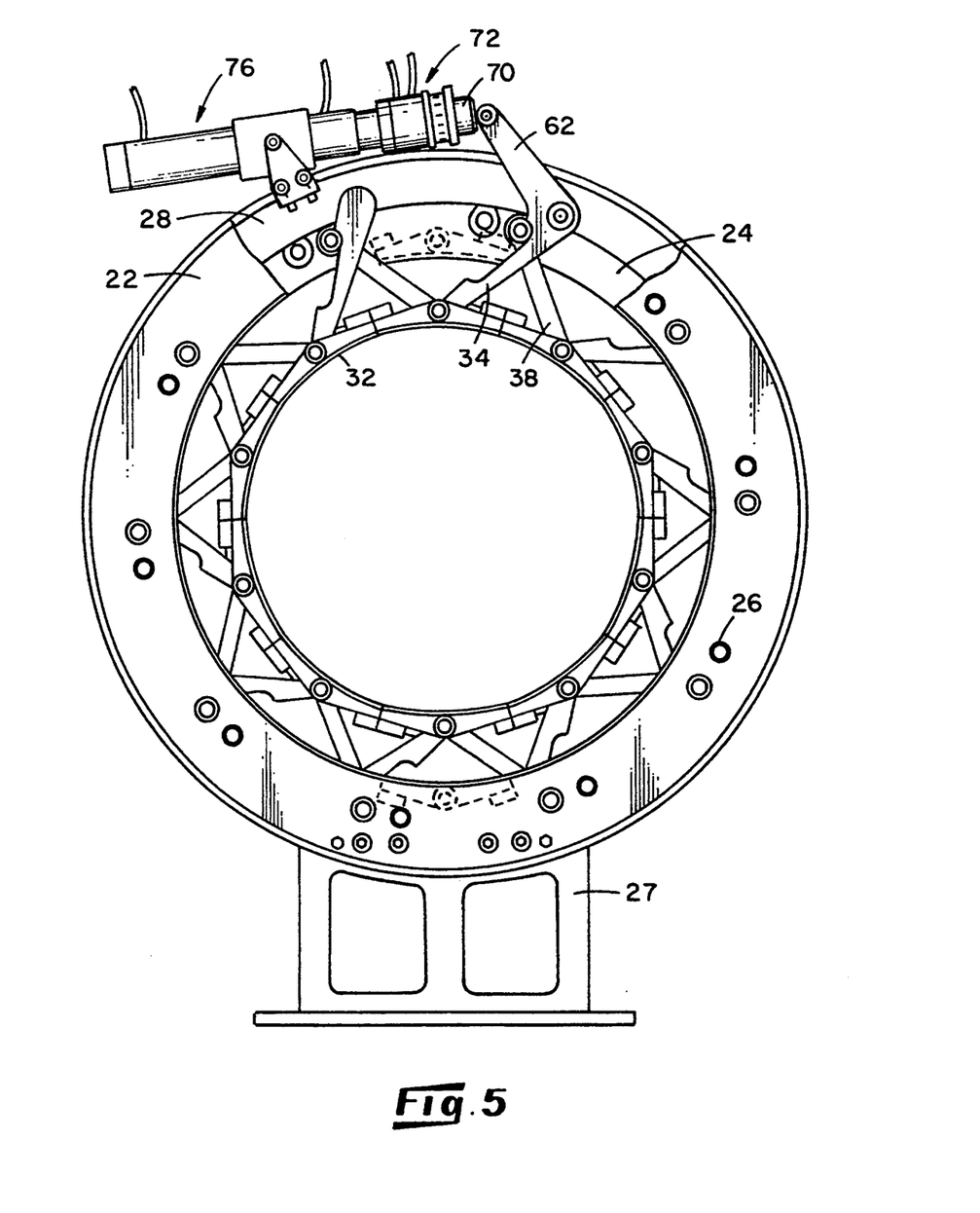
FIG. 5 is a side elevational view as in FIG. 4 and showing the shoes in their radially inward position.
Figure 6:
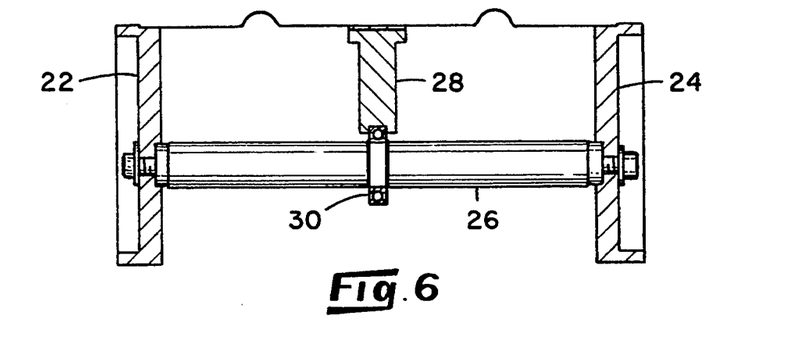
FIG. 6 is a sectional view taken along the line A—A of FIG. 4.
Figure 7:
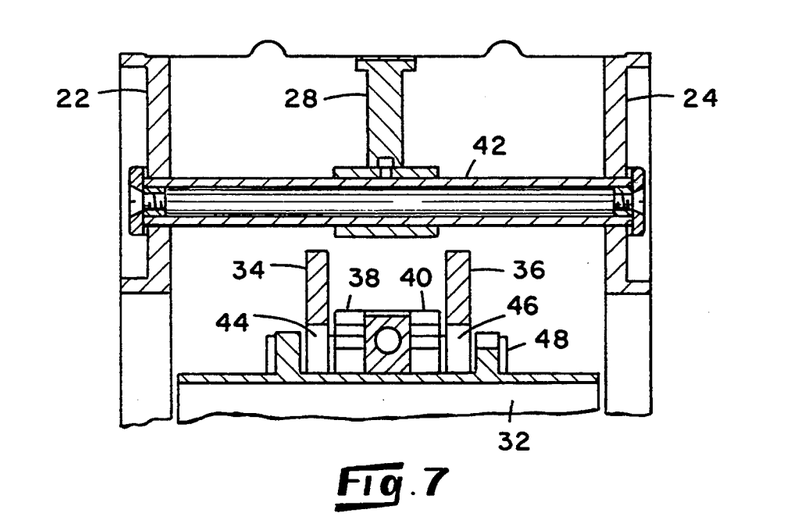
FIG. 7 is a sectional view taken along the line B—B of FIG. 4.
Figure 8:
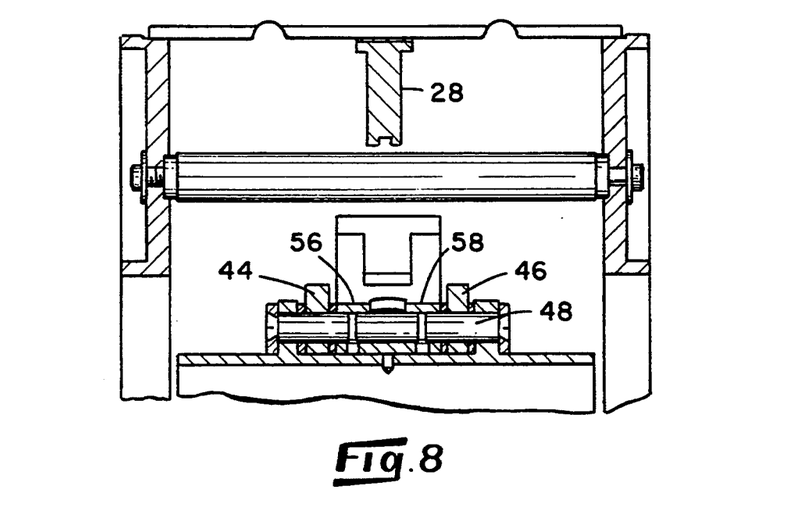
FIG. 8 is a sectional view taken along the line C—C of FIG. 4.
Figure 9:
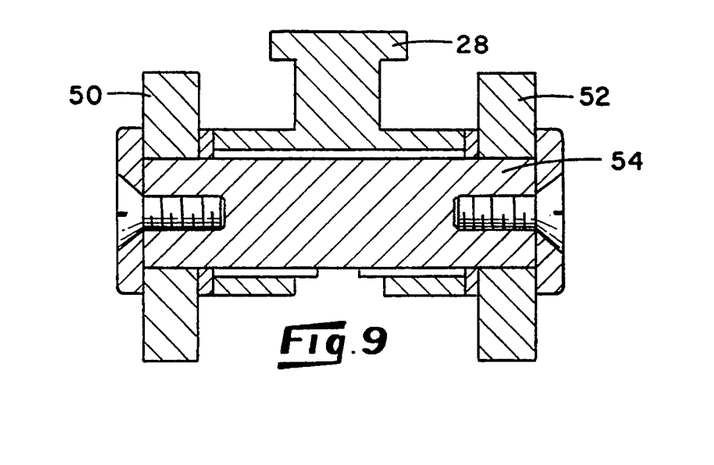
FIG. 9 is a sectional view taken along the line D—D of FIG. 4.

A plurality of shoes 32 are mounted for radial movement with respect to the housing rings 22 and 24 by means of a plurality of secondary linkage sets, each set including inner and outer links 34 and 36, and a plurality of "T"-links, each "T"-link including inner and outer links 38 and 40 which are rigidly secured to a shaft 42 extending transversely of the orientation of the links 38 and 40 and between the outer housing rings 22 and 24 (see FIGS. 4, 7 and 8). The most radially inward ends 44 and 46 of each of the links 34 and 36, respectively, are pivotally anchored to a respective shoe 32 as by means of a shaft 48 (see FIGS. 4 and 7). The opposite ends, end 50 for example, of the links 34 and 36 are pivotally anchored to the support ring 28 as by a shaft 54 (see FIG. 9). The radially inward ends 56 and each 58 of each "T"-link are pivotally mounted on the shaft 48 thereby securing these ends to the shoe 32.

One of the links of a set of secondary links, link 60 in FIG. 4, is modified by the addition to the end 50 thereof an extension arm 62 to define an actuator link 60. This arm 62 is rigid with respect to the link 34 and oriented at an acute angle with respect thereto to extend radially outwardly of the transfer ring.

In the depicted embodiment of FIG. 4, the outboard end 64 of the arm 62 of the actuator link 60 is pivotally connected, as by a shaft 66 of a tubular connector 67, to the end 68 of a transfer shaft 70 of a secondary motive means which in the depicted embodiment takes the form of a secondary piston-cylinder assembly 72. In turn, this secondary piston-cylinder assembly is operatively connected to a primary motive means which in the depicted embodiment takes the form of a primary piston-cylinder assembly 76. By these means, actuation of the primary piston-cylinder assembly and/or the secondary piston-cylinder assembly, and acting through the actuator link 60, the links 34 and 36, the "T"-links 38 and 40, and the support ring 28, serves to move the shoes radially inwardly or outwardly with respect to the transfer ring and between positions of engagement and nonengagement with a belt and tread package which is disposed within and encompassed by the transfer ring.

The depicted transfer ring, the housing rings, the support ring, the radially movable shoes, the linkages connecting the shoes to the transfer ring itself and to an external motive means are described for illustration purposes and may take any of the several embodiments of transfer rings heretofore known in the art. As noted hereinabove, however, prior art transfer rings are incapable of accommodating any dislocation of a belt and tread package which might occur after the shoes of the transfer ring have been moved radially inwardly and have grasped the belt and tread package.

With primary reference to FIGS. 4–9, in accordance with one aspect of the present invention there is provided in operative position between the primary motive means 76 and the actuator link 60, a secondary motive means 72. Whereas the primary and secondary motive means depicted in the Figures take the form of piston-cylinder assemblies, it is to be understood that other motive means may be employed without departing from the present invention. In any event, in accordance with the present invention, there is provided a secondary motive means which is capable of accommodating radially inward movements of the belt and tread package after the package has been initially grasped by the transfer ring. As noted hereinabove, this feature is accomplished through the means of a secondary motive means which is actuated upon the limiting out of the radially inwardly movement of the shoes of the transfer ring under the influence of the force applied by a primary motive means.

Figure 10:
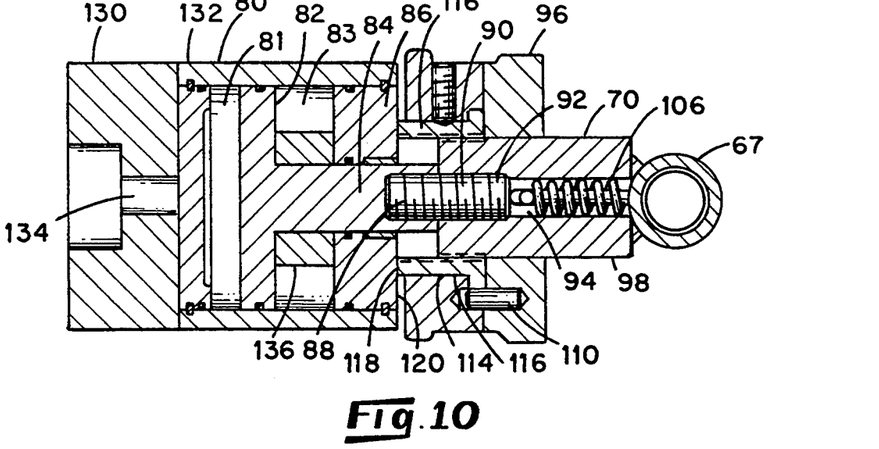
FIG. 10 is a side elevational view, in section of one embodiment of a secondary piston-cylinder motive means and taken generally along the line A—A of FIG. 11.
Figure 11:
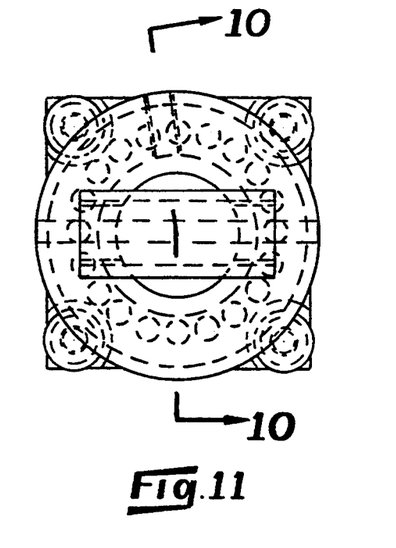
FIG. 11 is a right-hand end view of the secondary piston-cylinder motive means depicted in FIG. 10.
Figure 12:
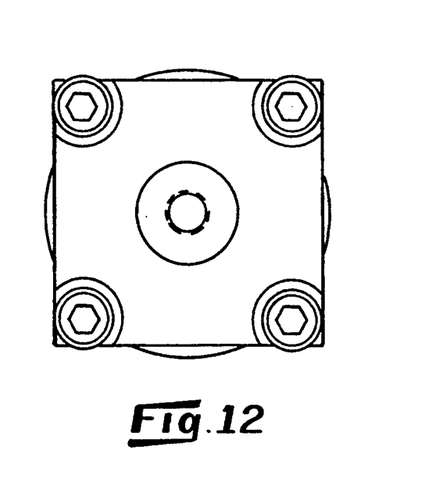
FIG. 12 is a left-hand end view of the secondary piston-cylinder motive means depicted in FIG. 10.

As depicted in FIG. 10, the secondary piston-cylinder means is of the double-acting type and includes a cylinder means 80 which serves to house therein a piston means 82 which is slidable within the cylinder between extended and retracted positions under the influence of pressure, such as hydraulic pressure, applied to one of the internal chambers 81 and 83 of the cylinder. The piston 82 includes a piston rod 84 which projects outwardly of the end wall 86 of the cylinder and is internally threaded to threadably receive therein one end 88 of an externally threaded connecting rod 90. The opposite end 92 of the rod 90 is threadably received within an internally threaded passageway 94 of the transfer shaft 70 to thereby connect the shaft 70 with the piston 82 so that movement of the piston 82 is translated into like movement of the shaft 70. As discussed hereinabove, this movement of the shaft 70 is translated by the components of the transfer ring into radial movement of the shoes 32 of the transfer ring.

Figure 13:
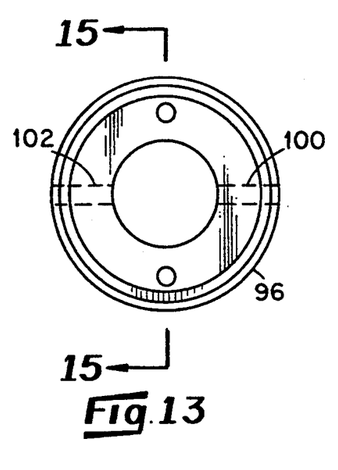
FIG. 13 is a plan elevational view of a locking ring employed in the secondary piston-cylinder motive means depicted in FIG. 10.
Figure 14:
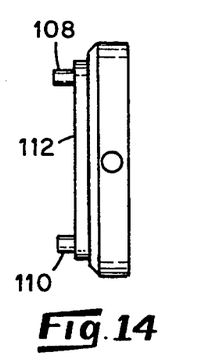
FIG. 14 is a side elevational view of the locking ring depicted in FIG. 13.
Figure 15:
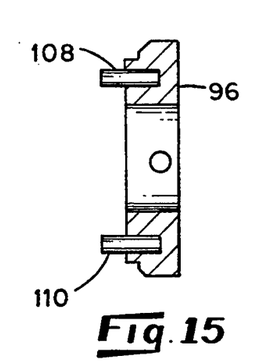
FIG. 15 is a side elevational view, in section of the locking ring depicted in FIG. 13 and taken generally along the line B—B of FIG. 13.
Figure 16:
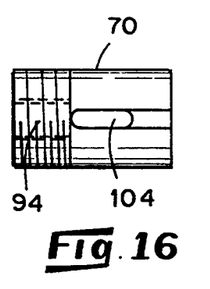
FIG. 16 is a side elevational view of a transfer shaft employed in the secondary piston-cylinder motive means depicted in FIG. 10.
Figure 17:
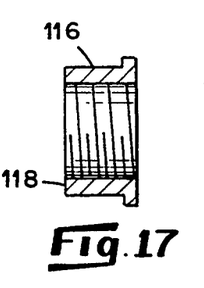
FIG. 17 is a left-hand end view of the transfer shaft depicted in FIG. 16.
Figure 18:
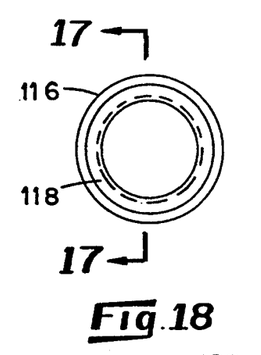
FIG. 18 is a sectional view, in side elevation, of a sleeve means employed in the secondary piston-cylinder motive means depicted in FIG. 10 and taken generally along the line D—D of FIG. 19.
Figure 19:
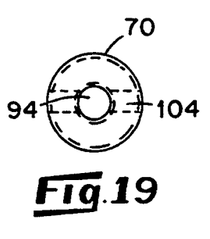
FIG. 19 is a left-hand end view, in elevation, of the sleeve means depicted in FIG. 18.
Figure 20:
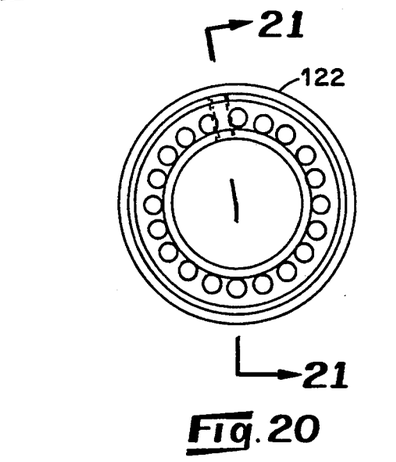
FIG. 20 is an elevational view of an adjustment ring employed in the secondary piston-cylinder motive means depicted in FIG. 10.
Figure 21:
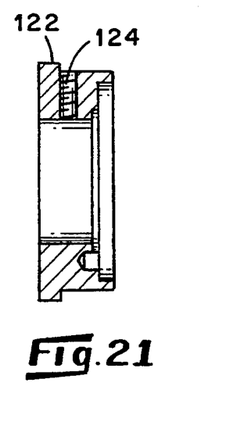
FIG. 21 is a side elevational view, in section, of the adjustment ring depicted in FIG. 20 and taken generally along the line 21—21 of FIG. 20.
Figure 22:
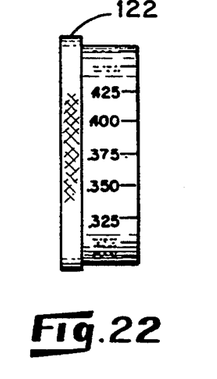
FIG. 22 is a side elevational view of the adjustment ring depicted in FIG. 20.

Importantly, in one aspect of the present invention, the limits of travel of the piston 82 within the cylinder 80, i.e. limits of extension and/or retraction of the piston, are selectively adjustable to thereby permit the selective adjustment of the extent of radial movement of each shoe of the transfer ring upon actuation of the secondary piston-cylinder means. In the depicted embodiment, this is accomplished by means of a novel micrometer nut subassembly which includes a locking ring 96 which is mounted on the circumference of the shaft 70 and rendered nonrotatable therewith by means of a pin 98 which extends transversely through the passageway 94 of the shaft 70 and into appropriate bore holes 100 and 102 provided 180 degrees apart in the first ring 96 (see FIG. 13). As best seen in FIG. 16, the passageway 94 includes a portion which defines a longitudinal slot 104 within which the pin 98 is free to slide. Spring means 106 disposed within the passageway 94 provides a force biasing the pin 98 and the locking ring in a direction toward the cylinder 80. One or more locking lugs 108 and 110 are provided on the inward face 112 of the locking ring and project inwardly of the subassembly (i.e. toward the cylinder 80).

The most longitudinally inward end 114 of the shaft 70 is provided with external threads and threadably receives thereon an internally threaded sleeve 116. The most inward end 118 of the sleeve is positioned to engage the end wall 120 of the cylinder 80 and serve as a stop against retraction of the piston 82 within the cylinder 80. Because of the threaded relationship of the sleeve 116 to the shaft 70, rotation of the sleeve upon the shaft provides for adjustment of the distance between the end 118 of the sleeve and the end wall 120 of the cylinder, thereby providing for selective adjustment of the extent of retraction movement of the piston.

An adjustment ring 122 (see FIGS. 10, 21–24) is provided in circumferentially encompassing relationship to the sleeve 116 and is releasably secured to the sleeve as by means of a set screw 124. When this adjustment ring is rotationally fixed to the sleeve 116, rotation of the adjustment ring serves to rotate the sleeve and establish its longitudinal position relative to the shaft 70. In the embodiment depicted in FIG. 10, for purposes of illustration, the sleeve 116 is shown with its end 118 in engagement with the end wall 120 of the cylinder and the piston is shown in its most extended position, a combination which prevents any movement of the piston within the cylinder 80. In this arrangement, the secondary motive means is effectively a rigid member and any motive force exerted by the primary motive means will be transmitted through the secondary motive means, without modification or adjustment, to the shoes. In the usual operational situation, however, the sleeve 116 is adjusted along the length of the shaft 70 to establish a clearance between the end 118 of the sleeve and the end wall 120 of the cylinder when the piston is so disposed within the cylinder as to be retracted upon the introduction of hydraulic pressure, for example, into the chamber 83 of the cylinder. Indicia are provided on the outer circumference of the adjustment ring 122 to provide a visual indication of the distance between the sleeve and the end wall 120 of the cylinder 80.

In the depicted embodiment, the limit of extension of the piston 82 within the cylinder 80 is established by means of a stop ring 126 positioned in encompassing relationship with the piston rod 84 and within the chamber 83 of the cylinder. This feature permits one to initially choose a piston-cylinder assembly in which the limits of travel of the piston are relatively large and then select a properly sized stop ring to limit the extension movement of the piston to that which may be required in a given situation. As desired, the sizing of the piston-cylinder (as respects the limits of travel of the piston) may be chosen to provide inherent limits of travel and thereby eliminate the use of a stop ring.

Referring to FIGS. 4 and 10, the secondary piston-cylinder means is operatively connected to the outboard end 128 of the piston rod 74 of the primary piston-cylinder means 76. In the depicted embodiment, this connection is accomplished by means of an end plate 130 affixed to the end 132 of the cylinder 80, this plate being provided with an internally threaded bore 134 into which there is received the externally threaded outboard end 128 of the piston rod 74 of the primary piston-cylinder assembly.

The primary piston-cylinder assembly, in the depicted embodiment, is of the conventional double-acting type in which the cylinder 133 is divided internally into two chambers 135 and 137 by a piston 139 which slidably disposed within the cylinder. Hydraulic pressure, for example, is transmitted into, or released from, the chambers through conventional conduits 136 and 138 which connect the chambers to a source of pressurized hydraulic fluid 140. The same source of pressurized hydraulic fluid may be used to supply pressurized fluid to the chambers 81 and 83 of the cylinder 80 via conduits 140 and 142. Selective control of the flow of the pressurized hydraulic fluid is provided for by conventional control means 144 including motion sensors, solenoid-operated valves, etc.

The primary piston-cylinder 76 is fixedly mounted on the adjustment ring 28. The location of this mounting about the circumference of the mounting ring is not critical so that if in a given tire manufacturing machine the mounting location requires a specific location, this requirement is readily accommodated by the present invention. Because of the rigid connection of the secondary piston-cylinder means to the primary piston-cylinder means, no independent mounting of the secondary piston-cylinder means is required.

It will be noted that because the primary piston-cylinder 76 is fixedly mounted to the mounting ring 28 which, in turn, is rotatably mounted within the housing rings 24 and 26, movement of either of the pistons 139 or 82 within their respective cylinders to actuate the linkages for radial movement of the shoes 32 results in a degree of counterclockwise movement of the mounting ring 28. This is occasioned by reason of the relationship of the linkages and the mounting of the primary piston-cylinder directly onto the rotatable mounting ring 28. When designing the ratio of movement of the pistons 139 and 82 within their respective cylinders to the resulting radial movement of the shoes, one must take into consideration this counterclockwise movement of the mounting ring. These relative movements of the several components of the device are well understood by those skilled in the art as are the calculations involved for establishing the movement ratio.

Figure 23:
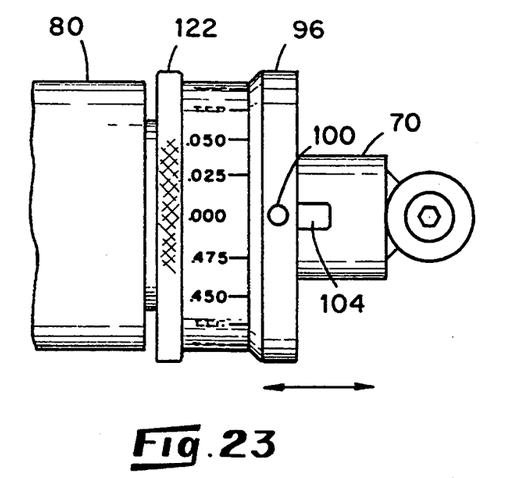
FIG. 23 is a partial side elevational view of a secondary piston-cylinder motive means and depicting the adjustment ring and locking ring in locking engagement.
Figure 24:
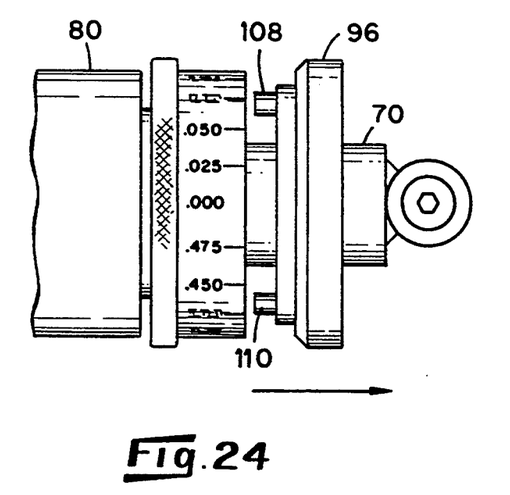
FIG. 24 is a partial side elevational view of a secondary piston-cylinder motive means and depicting the locking ring thereof out of locking engagement with the adjustment ring.

Referring to FIGS. 23 and 24, in the depicted embodiment, selective adjustability of the position of the sleeve 116, to which there is secured the adjustment ring 122, along the length of the threaded transfer shaft 70, is accomplished through rotation of the adjustment ring 122 about the shaft 70 to thereby rotate the sleeve about the shaft and cause the threaded sleeve to move longitudinally of the shaft 70. In the preferred embodiment, the rotational movement of the adjustment ring 122 is limited by means of the locking ring 96. This latter locking ring, as noted hereinabove, is nonrotatably mounted on the shaft 70, but is slidable longitudinally of the shaft 70 to the extent of the length of the longitudinal slot 104 provided in the shaft 70 and within which the pin 98, which passes through the bores 100 and 102 in the ring 96, resides. The face 123 of the adjustment ring 122 is provided, in the depicted embodiment, with a plurality, for example, twenty, outwardly opening bores 125 which are equally spaced apart in a circle around the perimeter of the face 123. The locking ring 96 is provided with at least one, and preferably two, locking pins 108 and 110 which project from the face 123 of the locking ring 96 and toward the open bores of the face of the adjustment ring 122. These locking pins are adapted to be received in respective ones of the open bores of the adjustment ring, when in register therewith, to thereby lock the adjustment ring against rotation when the pins are thus received, inasmuch as the locking ring is nonrotatable about the shaft 70. Recalling that the locking ring is biased by the spring means 106 toward the cylinder 70, the locking ring is thus biased toward its locking position with respect to the adjustment ring 122. However, when it is desired to adjust the distance between the end of the sleeve and the outward end of the cylinder 80, the locking ring may be moved longitudinally along the shaft 70 to withdraw the locking pins 108 and 110 from the open bores in the adjustment ring and thereby free the adjustment ring for rotation about the shaft 70. As noted, this rotational movement of the adjustment ring 122 provides for selection of the position of the sleeve 116 with respect to the end of the cylinder 80. Initial setting of the distance between the sleeve and the end wall of the cylinder 80 is accomplished when the piston 82 is in its most extended position within the cylinder 80 and the locking ring is disengaged from its locking relationship with the adjustment ring 122. Under these conditions, the sleeve is initially positioned in engagement with the end wall of the cylinder 80 and the adjustment ring is thereupon rotated until the zero indicia marking on the adjustment ring is aligned with a line mark 160 on the circumference of the locking ring, whereupon the locking ring is released to permit the biasing action of the spring 106 to move the pins 108 and 110 into respective open bores in the adjustment ring to lock these rings against further rotational movement relative to one another so long as they are so engaged. Subsequent adjustment of the distance of the sleeve from the end wall of the cylinder 80 is accomplished merely by disengaging the locking ring from the adjustment ring, rotating the adjustment ring to the amount required to reposition the sleeve from the end wall, and reengaging the locking ring to secure the adjustment.

In a typical operation of the present invention, the transfer ring is moved into position about a belt and tread package which has been formed on the belt and tread drum. Thereupon the primary piston-cylinder is activated by the introduction of pressurized fluid to the chamber 137 thereof to retract the piston 139 within the cylinder 133. Again because of the rigid relationship between the primary and secondary piston-cylinder assemblies, this retraction movement of the piston 139 is transferred through the secondary piston-cylinder assembly, through the actuator link 60, to the several linkages and support ring 28, thence to the shoes 32 to move the shoes radially inwardly of the transfer ring to engage the belt and tread package. It is to be noted that the depicted arrangement of the linkages and other components of the transfer ring, retraction of the piston 139 moves the shoes radially inwardly and extension of the piston 139 moves the shoes radially outwardly. This same relationship of movement of the shoes is carried over into the retraction and extension of the piston 82 of the secondary piston-cylinder assembly. It will be recognized that this relationship of movement of the piston and the shoes could be reversed as desired.

This initial movement of the shoes by the action of the primary piston-cylinder assembly is limited to that extent of inward movement of the shoes as will cause the shoes to engage the belt and tread package, but will not deleteriously deform the package, such as imprinting the footprint of a shoe within the package. Such shoe imprinting can result in the formation of cavities which capture air, or in the localized weakening of the tire in the course of marrying of the belt and tread package to the carcass.

Upon the limiting out of the retraction of the piston 139, the movement of the piston 139 within the cylinder 133 is braked, as by the equalization of the pressure within the chambers 135 and 137 of the cylinder via the control means 144. Thereupon pressurized hydraulic fluid is admitted to the chamber 83 of the secondary piston-cylinder 72 to effect retraction of the piston 82 within the cylinder 80. Because the movement of the piston 139 is braked and recalling the rigid relationship between the primary and secondary piston-cylinder assemblies, it will be recognized that retraction of the piston 82 within the cylinder 80 effects further radially inwardly movement of the shoes of the transfer ring. The extent of this further movement is limited to that movement of the piston 82 which is permitted by the position of the sleeve 116 to the end wall 120 of the cylinder 80 so that the further movement of the shoes, following their initial engagement with the belt and tread package, is selectively adjustable by selectively adjusting the position of the sleeve 116 relative to the end wall of the cylinder 80. In a typical embodiment, the range of adjustment of the retraction movement of the piston is between a maximum of about one-half inch and a minimum of zero. Commonly, the desired secondary movement of the shoes is less than about one-fourth inch per shoe. Therefore, the separation distance of the sleeve 116 and end wall of the cylinder 80 is selected to be about one-fourth inch when there is a one-to-one relationship between the movement of the secondary piston 82 and movement of each shoe of the transfer ring. This movement of each shoe radially any given amount produces a change in diameter of the circle defined by the shoes of twice the radial movement of a single shoe. It will be recognized that the range of radial movement of the shoes 32 can be altered by relocating the shafts 42 and 54 radially inwardly or outwardly of the transfer ring to thereby alter the triangular relationship of these shafts and the shaft 48 which mounts a shoe to the linkages which serve to move the shoe radially inwardly and outwardly.

Whereas the invention has been described herein in terms of specific embodiments, one skilled in the art will recognize equivalents thereof, and the invention is intended to be limited only as set forth in the claims appended hereto.

What is claimed:

1. In a transfer ring for use in a system for the manufacture of vehicle tires wherein said ring includes a plurality of shoes radially movable between a position of engagement with a belt and tread package about the outer circumference thereof and a position out of engagement with said belt and tread package, said transfer ring including means for actuating said shoes for movement between said positions of engagement and disengagement with said belt and tread package, the improvement comprising first and second motive means disposed in operative alignment with one another, means linking said first and second motive means to said shoes of said transfer ring for effecting radial movement of said shoes upon actuation of said first and second motive means, means actuating said first motive means for causing said shoes to move radially inwardly of said transfer ring and initially grasp said belt and tread package, and means actuating said second motive means, after said first motive means has achieved its most radially inwardly limit of movement of the shoes of said transfer ring, to thereby move said shoes a further radial distance inwardly.

2. The transfer ring of claim 1 wherein said first and second motive means comprise first and second piston-cylinder means, respectively.

3. The transfer ring of claim 2 and including means for selectively adjusting the effective extent of travel of the piston component of said second piston-cylinder means to thereby selectively adjust the extent of radial movement of each shoe of said transfer ring effected by said second piston-cylinder means.

4. The transfer ring of claim 1 wherein the permissible extent of further radial movement of said shoes by said second motive means is limited to about one-half inch or less radial movement of each shoe of said transfer ring.

5. The transfer ring of claim 1 and including means for selectively adjusting the extent of radial movement of said shoes by said second motive means.

6. In a transfer ring for use in a system for the manufacture of vehicle tires wherein said ring includes a plurality of shoes radially movable between a position of engagement with a belt and tread package about the outer circumference thereof and a position out of engagement with said belt and tread package, said transfer ring including means for actuating said shoes for movement between said positions of engagement and disengagement with said belt and tread package, the improvement comprising a first piston-cylinder means adapted to effect relatively gross radial movement of said shoes between said positions of engagement and disengagement with said belt and tread package, and a second piston-cylinder means disposed relative to said first piston-cylinder means so as to effect relatively small limited additional movement of said shoes radially inwardly toward said belt and tread package after said first piston-cylinder means has completed its movement of said shoes into engagement with said belt and tread package.

7. The transfer ring of claim 6 and including means braking said first piston-cylinder means against movement after said first piston-cylinder means has caused said shoes to engage said belt and tread package.

8. The transfer ring of claim 7 and including means actuating said second piston-cylinder after said first piston-cylinder means has been braked.

9. The transfer ring of claim 6 and including means for selectively adjusting the extent of radially inward movement of said shoes by said second piston-cylinder means.

10. The transfer ring of claim 9 wherein said means for selectively adjusting the extent of radially inward movement of said shoes by said second piston-cylinder means includes linkage means disposed between said second piston-cylinder means and said shoes and adapted to move said shoes in response to movement of the piston rod component of said second piston-cylinder means, rigid transfer shaft means operatively connected at one of its ends to said linkage means and at its other end being rigidly connected to said piston rod component of said second piston-cylinder means whereby longitudinal movement of said shaft means effects movement of said linkage means, at least the most inward end of said shaft means having external threads, internally threaded sleeve means threadably received on said externally threaded shaft portion and including a surface thereof adapted to engage said cylinder component of said second piston-cylinder means, adjustment ring means circumferentially encompassing at least a portion of the outer perimeter of said sleeve means, means for releasably securing said adjustment ring means to said sleeve means whereby when said adjustment ring is secured to said sleeve means, rotation of said adjustment ring effects rotation of said sleeve means and resultant movement of said sleeve means longitudinally of said shaft means, locking ring means disposed about the girth of said shaft means and being nonrotatable relative to said shaft means and limitedly longitudinally displaceable therealong, said locking ring means further including internal threads thereon, means for releasably connecting said adjustment ring and said locking ring to one another to thereby render said adjustment ring nonrotatable relative to said shaft means.

11. The transfer ring of claim 10 including means for rigidly connecting said piston rod component of said second piston-cylinder means to said threaded shaft portion.

12. The transfer ring of claim 10 and including indicia associated with said adjustment ring means suitable to visually indicate the distance between that surface of said sleeve means adapted to engage said cylinder component of said second piston-cylinder means and said cylinder component of said second piston-cylinder means.

13. The transfer ring of claim 6 wherein said transfer ring includes first and second outer housing rings and an inner ring rotatably mounted therebetween and including means mounting said first piston-cylinder means on said inner ring for movement therewith upon actuation of said first piston-cylinder means.

14. The transfer ring of claim 10 wherein the extent of radially inward movement of each shoe of said transfer ring is directly proportional to the extent of extension of said piston component of said second piston-cylinder means.

15. The transfer ring of claim 14 wherein there is a one to one ratio of the movement of each of said shoes to the extent of movement of said piston component of said second piston-cylinder means.

* * * * *